No. 802,332. PATENTED OCT. 17, 1905.
J. M. LEDFORD.
VEHICLE WHEEL.
APPLICATION FILED APR. 27, 1905.
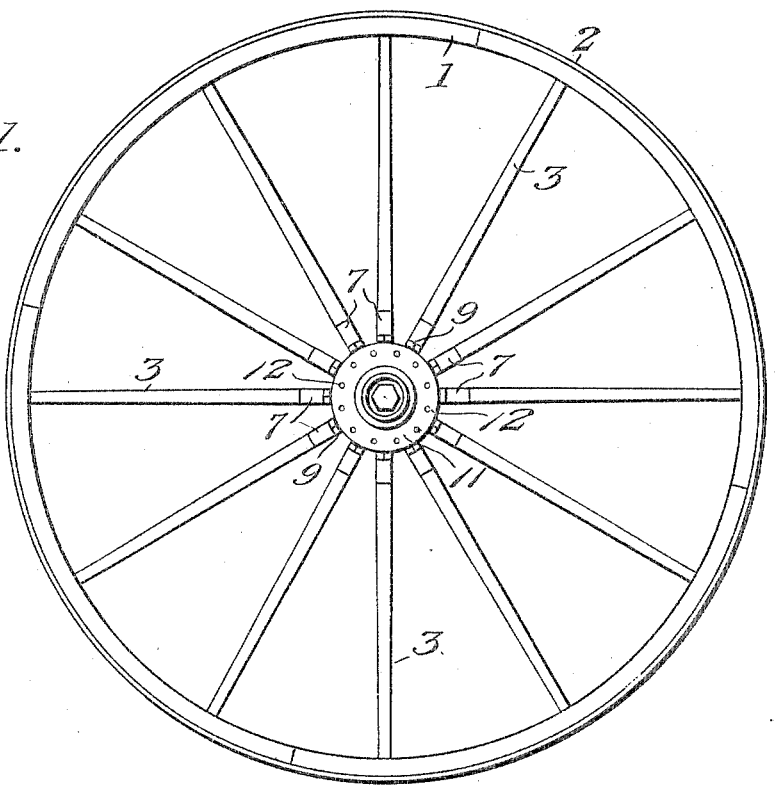
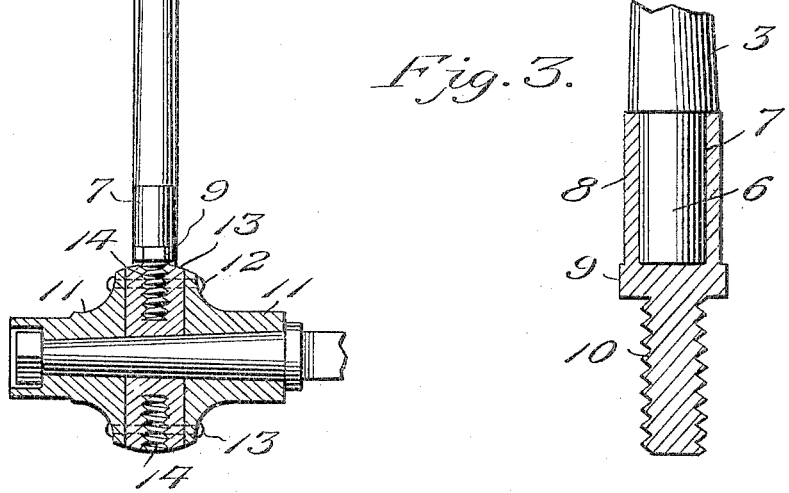
Witnesses
Edwin G. McKee
D. W. Gould.
Inventor
John M. Ledford
By Victor J. Evans
Attorney

UNITED STATES PATENT OFFICE.

JOHN M. LEDFORD, OF HOOD RIVER, OREGON.

VEHICLE-WHEEL.

No. 802,332.  Specification of Letters Patent.  Patented Oct. 17, 1905.

Application filed April 27, 1905. Serial No. 257,698.

*To all whom it may concern:*

Be it known that I, JOHN M. LEDFORD, a citizen of the United States, residing at Hood River, in the county of Wasco and State of Oregon, have invented new and useful Improvements in Vehicle-Wheels, of which the following is a specification.

The invention relates to improvements in wheels, and particularly to means whereby the wheel-fellies may be expanded to tighten the tires without removing the wheel from the vehicle or separating the wheel members.

The main object of the invention is the provision of a simple and durable structure in the use of which the spokes may be forced radially of the wheel to expand the fellies without separating the wheel members.

The invention consists in certain details of structure and combination of parts, which will be described in the following specification and which are clearly illustrated in the accompanying drawings, wherein—

Figure 1 is a view in elevation of a wheel constructed in accordance with my invention. Fig. 2 is an enlarged sectional view through the felly and wheel-hub, a spoke being shown in elevation. Fig. 3 is an enlarged sectional view of the spoke-socket, a part of the spoke being shown in place therein.

Referring to the drawings, wherein like reference-numerals indicate like parts throughout the views, my improved wheel comprises a sectional felly 1 and tire 2, both of which parts may be of any preferred or usual construction.

The spokes 3 are tenoned at 4 on their outer ends to fit within sockets 5, formed in the felly, the specific arrangement of the connection between this end of the spoke and the felly being immaterial so far as the features of my invention are concerned.

The inner or hub end of the spokes is reduced to provide a tenon 6, arranged to fit snugly within a metallic socket 7, the wall 8 of which is equal in external diameter to the diameter of the spoke adjacent the socket, whereby the juncture between the spoke and socket presents an unbroken appearance. The lower end of the socket 7 is enlarged to provide a projecting portion 9, which may be of square or hexagonal shape for convenience in turning the socket. A threaded stud 10 depends from the projection 9 in alinement with the socket 7. By preference the socket projection and threaded rod are formed integral by casting or otherwise.

The hub 11 of the wheel is divided into two vertical sections, and between these sections I secure by fastenings 12 a metallic section 13, formed with threaded openings 14 to receive the threaded projections 10 from the sockets 7.

Each of the spokes 3 is provided at its hub end with a socket-piece 7, and the openings 14 in the metallic hub-section are arranged to receive the projections 10 from the spoke-socket pieces, whereby the spokes are assembled radially of the hub, with their outer ends seated in the felly-sockets 5, as will be evident.

When it is desired to expand the felly to tighten the tire, the socket-pieces 7 are revolved through the medium of the nuts 9 to force said socket-pieces radially from the metallic hub-section. This operation forces the spokes radially from the hub and expands the felly to the desired degree.

The threaded connection between the socket-pieces and the metallic hub-section affords a means for the close individual adjustment of the spokes, so that the tire may be readily tightened and the shape of the wheel adjusted by the manipulation of certain of the spokes without affecting the remaining spokes.

Having thus described the invention, what is claimed as new is—

A wheel comprising a felly, spokes secured therein, a hub having a central metallic portion formed with threaded openings, and socket-pieces secured on said spokes, said socket-pieces being provided with projecting studs to engage the threaded openings in said metallic section, the connection between the socket-pieces and spokes being plain to permit revolution of said socket-pieces without varying the relative position of said sockets and spokes.

In testimony whereof I affix my signature in presence of two witnesses.

JOHN M. LEDFORD.

Witnesses:
 H. M. ABBOTT,
 JOHN LELAND HENDERSON.